United States Patent
Satou et al.

[11] Patent Number: 6,117,589
[45] Date of Patent: Sep. 12, 2000

[54] LITHIUM BATTERY WITH ROUGHENED ELECTRODE TAB

[75] Inventors: Kouichi Satou, Hyogo; Kazunari Ookita; Yoshito Chikano, both of Osaka; Mitsuzou Nogami, Tokushima; Ikuo Yonezu; Koji Nishio, both of Osaka, all of Japan

[73] Assignee: Sanyo Electric Co., Ltd., Osaka, Japan

[21] Appl. No.: 09/196,759

[22] Filed: Nov. 20, 1998

[30] Foreign Application Priority Data

Nov. 21, 1997 [JP] Japan .................................. 9-321058

[51] Int. Cl.[7] ................................. H01M 2/26
[52] U.S. Cl. ................. 429/211; 429/161; 429/178
[58] Field of Search .................. ; 429/211, 161, 429/178; H01M 2/26

[56] References Cited

U.S. PATENT DOCUMENTS

| | | | |
|---|---|---|---|
| 4,443,918 | 4/1984 | Morinari et al. | 29/3 |
| 5,154,993 | 10/1992 | Beatty | 429/211 |
| 5,162,178 | 11/1992 | Obsawa et al. | 429/218 |
| 5,185,224 | 2/1993 | Barnabei et al. | 429/218 |
| 5,871,861 | 2/1999 | Hirokou et al. | 429/161 |

FOREIGN PATENT DOCUMENTS

| | | |
|---|---|---|
| 6-267528 | 9/1994 | Japan . |
| 8-195202 | 7/1996 | Japan . |
| 10-233233 | 9/1998 | Japan . |

*Primary Examiner*—John S. Maples
*Attorney, Agent, or Firm*—Kubovcik & Kubovcik

[57] ABSTRACT

A lithium battery and method for manufacturing the lithium battery are provided. The battery includes electrodes formed of a layer of an active material, the active material being capable of occluding and discharging lithium electrochemically, provided on the surface of a current collector, electrode external terminals for providing electricity to the outside of the battery, and an electrode tab joined at an end thereof to a surface of said current collector and at another end thereof to an electrode external terminal. The electrode tab has a roughened surface at the end joined to the current collector, and the roughened surface is welded to the surface of said current collector. The roughened surface is produced by chemical etching, abrasion by an abrasive, abrasion by ultrasonic waves or by blasting with an abrasive.

2 Claims, 10 Drawing Sheets

LITHIUM BATTERY WITH ROUGHENED ELECTRODE TAB

FIELD OF THE INVENTION

The present invention relates to a lithium battery in which a current collector and an electrode external terminal are connected electrically by an electrode tab, and specifically relates to a lithium battery having a reduced electric resistance between the electrode tab and the current collector.

BACKGROUND OF THE INVENTION

Development of a secondary battery having high energy density and free from environmental pollution has lately been required.

A conventional manufacturing method of a lithium secondary battery is explained below in conjunction with FIGS. 8 to 10. Since the steps to manufacture a negative electrode and a positive electrode are the same, only the steps to manufacture the positive electrode are explained below.

In FIG. 10, a positive electrode (40) and a negative electrode (50) are wound as spiral coils with a separator (60) interposed therebetween, and are housed in a battery can (61). The positive electrode (40) is connected to a positive electrode external terminal (42) through a positive electrode tab (41). The negative electrode (50) is also connected to a negative electrode external terminal (52) through a negative electrode tab (51). An insulating packing (65) comprising a pair of insulators (63) and (64) is inserted at connected areas of a sealing board (62) and the positive electrode external terminal (42) and a sealing board (62) and the negative electrode external terminal (52). The insulating packing (65) is fastened by a pair of nuts (66) from both sides, i.e. upper and bottom, and is fixed to make the lithium secondary battery airtight.

FIG. 8 illustrates a positive electrode tab (41) joined to a positive electrode (40) in a conventional lithium secondary battery. The positive electrode (40) includes a current collector (48) having coated portions on both surfaces of active material layers (47) comprising an active material, an electrically conductive filler, and the like, and uncoated portions (49) provided at regular intervals. A positive electrode tab (41) is joined to an uncoated position on the surface of the current collector (48) at an end portion of the positive electrode tab (41).

A method of joining positive electrode tab (41) to positive electrode (40) is concretely explained below in conjunction with FIG. 9. The uncoated portion (49) and the positive electrode tab (41) are placed together as shown in FIG. 9(a), and are joined to each other by spot-welding. At this stage, the current collector (48) and the positive electrode tab (41) are joined only at portions where electricity passed during spot-welding, and remaining portions are not joined as shown in FIG. 9(b). Pressure is applied to the current collector (48) and the positive electrode tab (41) at the joint area vertically by a pressing machine to increase the contact area and to reduce contact resistance between the current collector and the positive electrode tab.

A conventional current collector and electrode tab are formed by rolling, and the surface of the electrode tab is a so-called rolled finished surface (44). Portions of the electrode tab which are not joined by spot-welding become separated, or detached, after the pressing process by so-called elastic reset as shown in FIG. 9(c). This causes a reduction in the contact area, increases internal resistance of the battery which is caused by contact resistance, and reduces output at high current discharge and reduces discharge capacity of the battery.

It has been disclosed that a contact area of a electrode active material and a current collector can be increased to reduce contact resistance and to improve output property (Japanese Patent Laid-open Hei 8-195202). However, contact resistance between an electrode tab and a current collector has not been reduced.

OBJECT OF THE INVENTION

An object of the present invention is to increase contact area between a electrode tab and a current collector and to reduce contact resistance between them, and to provide a lithium battery having improved discharge capacity at high electric current discharge and improved power.

SUMMARY OF THE INVENTION

A lithium battery of the present invention is characterized in that it comprises electrodes formed of an active material layer, the active material being capable of occluding and discharging lithium electrochemically, provided on the surface of a current collector, electrode external terminals for providing electricity to the outside of the battery, and an electrode tab joined at an end thereof to a surface of said current collector and being connected at another end thereof to said electrode external terminal, wherein said electrode tab has a roughened surface at the end joined to said current collector, and said roughened surface is welded to the surface of said current collector.

Peaks on the roughened surface of the electrode tab push in the surface of the current collector. Contact area of the electrode tab and the current collector increases and contact resistance is reduced. Therefore, a lithium battery having such an electrode tab has a smaller internal resistance as compared to a conventional battery, has improved discharge capacity at high electric current discharge and an improved output property.

The roughened surface of the electrode tab can be produced by chemical etching, abrasion by an abrasive, abrasion by ultrasonic waves or by blasting with an abrasive. Chemical etching useful for this invention is for example, acid treatment. As an abrasive, sandpaper, an abrasive material, can be illustrated. Abrasion by blasting is preferred because of simplicity and control of surface roughness.

The electrode tab and the current collector can be welded by spot-welding, ultrasonic welding, high frequency welding and the like.

A method of manufacturing a lithium battery which has electrodes formed of an active material layer provided on the surface of a current collector, the active material being capable of occluding and discharging lithium electrochemically, electrode external terminals to provide electricity to the outside of the battery, and electrode tabs joined at an end thereof to the surface of said current collector and being connected at the other end thereof to an electrode external terminal, comprises a step to roughen the surface of said electrode tab;

a step to place said electrode tab in contact with said current collector with the roughened surface of said electrode tab facing the surface of said current collector, and to weld the electrode tab and current collector together; and a step to apply pressure to said electrode tab and said current collector in the direction of contact, and to pressure weld.

A method of manufacturing a lithium battery of the invention is explained below in conjunction with FIG. 2. The explanation below is directed to a positive electrode (10) and a positive electrode tab (11). However, negative electrode (20) and negative electrode tab (21) can also be prepared in the same manner.

The following is an illustration of forming a roughened surface by blasting and of joining the blast finished electrode tab and current collector.

In a step of blasting, an abrasive is blasted against the surface of the positive electrode tab (11) to roughen the surface and to form a blast finished surface (13). In a following step of connecting, the positive electrode tab (11) having peaks and valleys formed on the surface, i.e., roughened, and a positive electrode (10) are stacked together so that the blast finishing surface (13) faces the surface of an uncoated portion (19) of a current collector (18) as shown in FIG. 2 (a). The positive electrode tab (11) is joined to the current collector (18) by spot-sandpaper welding. Further, the positive electrode (11) and the current collector are pressed together as shown in FIG. 2(c). After the pressure is released, the positive electrode tab (11) tries to separate from the current collector by elastic reset. However, peaks of the blast finishing surface (13) of the positive electrode tab (11) push in the surface of the current collector (18) (as shown in FIG. 2(c)) to prevent the electrode tab from separating from the current collector (18). Therefore, contact area of the positive electrode tab (11) and the current collector (18) is increased, and contact resistance is reduced.

A lithium battery of the present invention has a smaller contact resistance between an electrode tab and a current collector, has improved discharge capacity at high electric current discharge and improved output property.

When the maximum difference between the height of a peak and the depth of a valley of the blast finishing surface is greater than 5 $\mu$m, the effect of roughening the surface of the electrode tab increases significantly. The effect reaches a maximum at a difference of about 10 $\mu$m and does not change with an increase in difference in height. Therefore, the maximum difference between the height of a peak and the depth of a valley of the blast finished surface is preferably between about 5 $\mu$m and 10 $\mu$m.

The maximum difference (H) between a peak and valley of the blast finished surface (13) as shown in FIG. 6 is defined as the length (Hmax) of the highest peak (15) from the untreated surface (14) of the electrode tab (11) minus the length (Hmin) of the deepest valley (16) from the untreated surface (14) of the electrode tab (11). A stylus type surface roughness tester can be used to measure the depth difference. A maximum difference (H) of a negative electrode tab (21) is measured in the same manner as the positive electrode tab (11).

Figure 1:
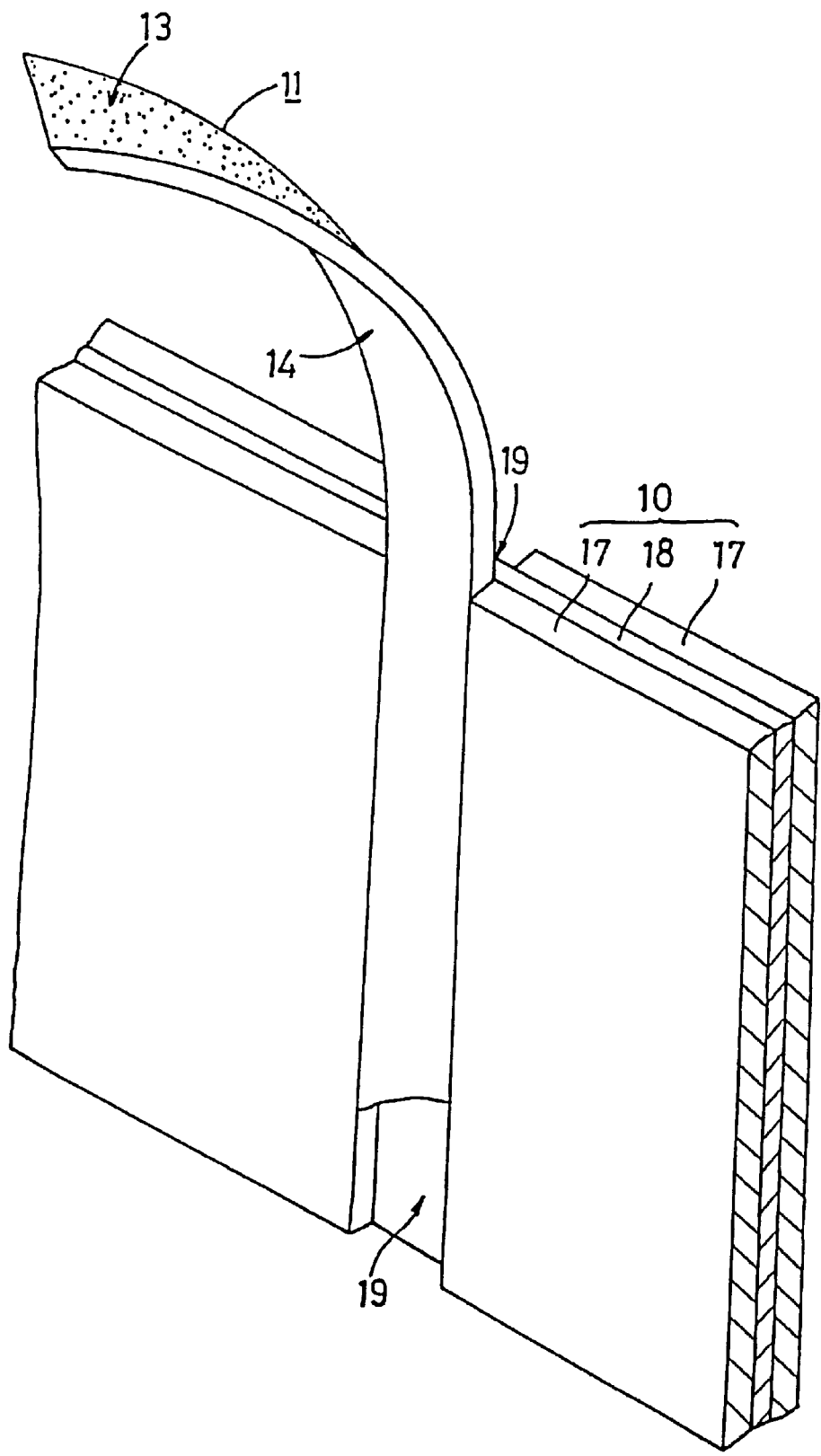
FIG. 1 is a partial view illustrating a structure of an electrode tab and an electrode of the present invention.

1: lithium secondary battery
10: positive electrode
11: positive electrode tab
12: positive electrode external terminal
13: blast finishing surface
14: peak
15: top of highest peak
16: bottom of lowest valley
17: active material layer
18: current collector
19: uncoated portion
20: negative electrode
21: negative electrode tab
22: negative electrode external terminal
7: blast finishing equipment
70: compressor
71: abrasive tank
72: ejector
73: nozzle
74: substrate

DETAILED DESCRIPTION OF PREFERRED EMBODIMENTS

In the lithium secondary battery of the present invention, the electrode tabs are harder or stiffer than the current collectors. For example, the positive electrode tab is typically made from an aluminum sheet and the positive current collector from an aluminum foil and the negative electrode tab is typically made from nickel or copper sheet and the negative electrode collector from a copper foil. It is believed, therefore, that peaks formed on the roughened surface of the electrode tabs by the techniques described herein such as blasting can push in the surface of the softer collector foil and reduce elastic reset.

Figure 3:
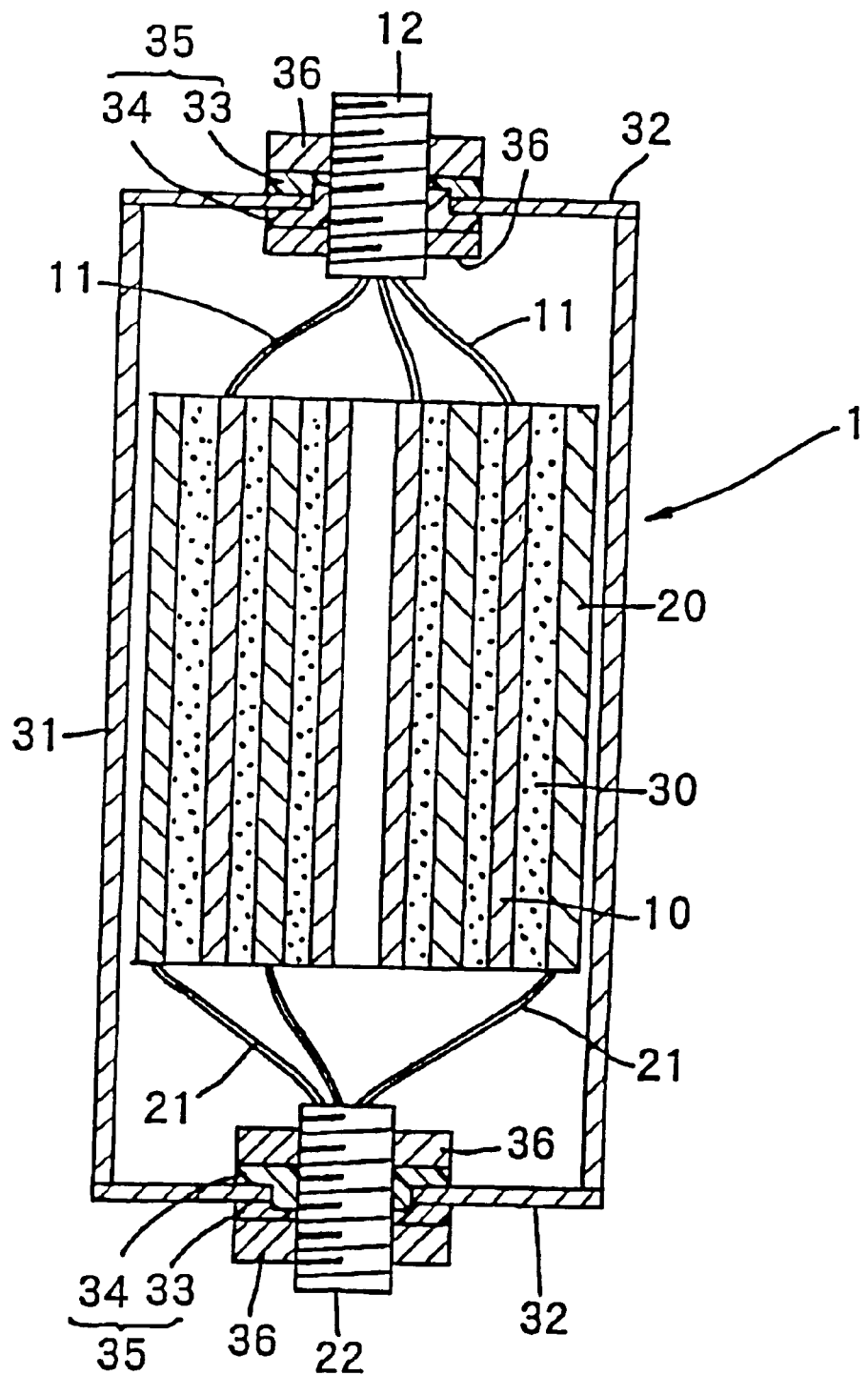
FIG. 3 is a cross section of a lithium secondary battery of the present invention.

The present invention applied to an oversized cylindrical lithium secondary battery (shown in FIG. 3) is described below in detail.

A lithium secondary battery of the present invention comprises a positive electrode (10), a negative electrode (20), a separator (30), a positive electrode tab (11), a negative electrode tab (21), a positive electrode external terminal (12), a negative electrode external terminal (22), battery can (31) and a sealing board (32). The positive electrode (10) and the negative electrode (20) are wound as spiral coils with a separator interposed therebetween and are housed in battery can (31). The positive electrode (10) is connected to the positive electrode external terminal (12)

through the positive electrode tab (11). The negative electrode (20) is connected to the negative electrode external terminal (22) through the negative electrode tab (21). An insulating packing consisting of a pair of insulators (33 and 34) is disposed around each of the positive electrode external terminal (12) and the negative electrode external terminal (22) to separate them from the sealing board (32). The insulating packing (35) is fastened by a pair of nuts (36) to seal the lithium secondary battery (1).

FIG. 1 illustrates the connection between positive electrode (10) and positive electrode tab (11) of a lithium secondary battery of the present invention. The positive electrode (10) comprises an active material layer (17) made up of an active material, an electrically conductive material and the like on both sides of the current collector (18), and an uncoated portion (19) provided at regular intervals. An end of the positive tab (11) which is finished by blasting is placed on one side of the uncoated portion (19) of the current collector (18) so as to face the blast finished surface (13) to the uncoated portion (19).

Figure 4:
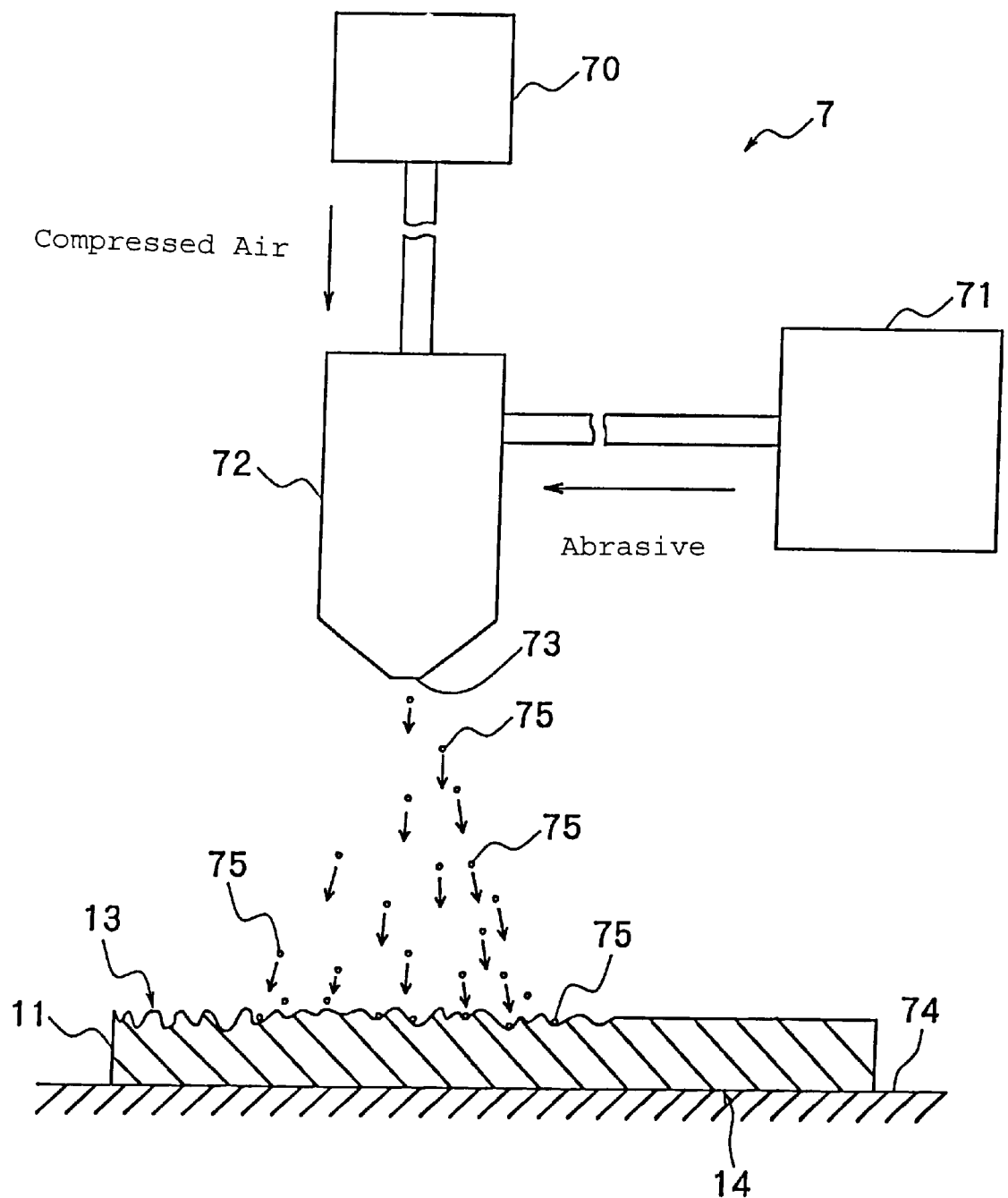
FIG. 4 illustrates the structure of blasting equipment useful in the present invention.

FIG. 4 illustrates equipment (7) for blasting an electrode tab. An ejector (72) is connected to an outlet of a compressor (70), and a tank (71) for holding an abrasive is connected to the ejector (72). The positive electrode tab (11) is placed on a substrate (74) which faces a nozzle (73) of the ejector (72). Compressed air is blasted against the positive electrode tab (11) from the compressor (70). Particles of the abrasive (75) in the abrasive tank (71) are carried into the ejector (72), and are blasted with the compressed air onto the positive electrode tab (11) to roughen the surface of the positive electrode tab (11) to create a blast finished surface (13).

Figure 2A:
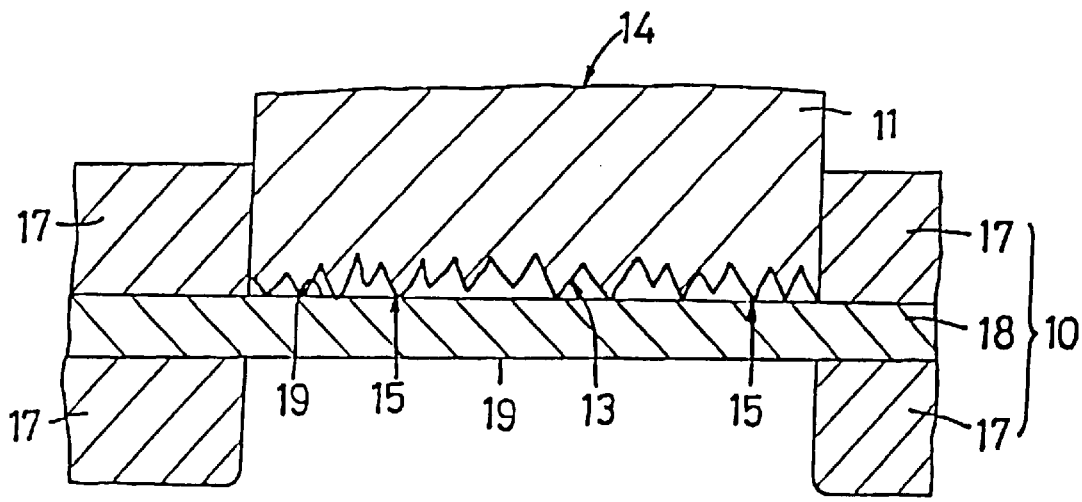
FIG. 2 illustrates steps of joining an electrode tab to an electrode in the present invention.
Figure 2B:
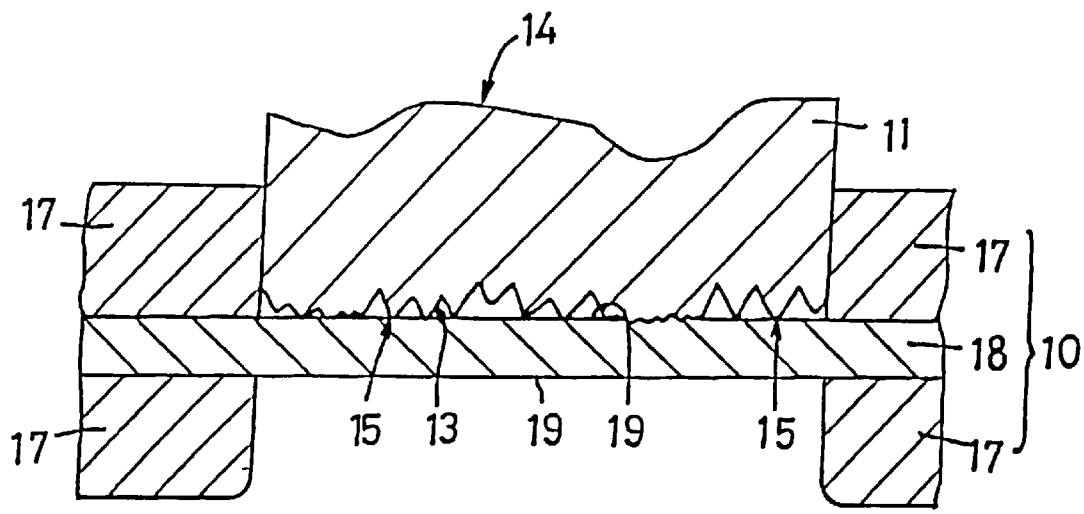
Figure 2C:
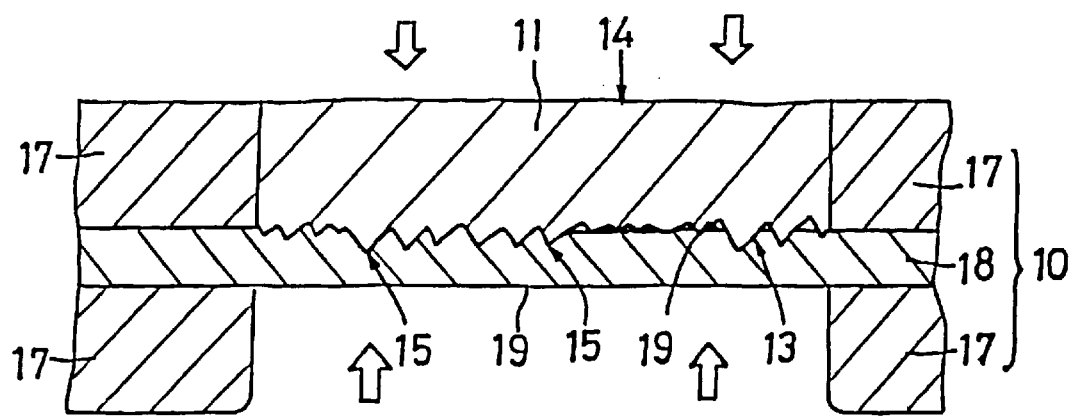

The positive electrode tab (11) and the positive electrode (10) are joined as follows. The positive electrode tab (11) having peaks and valleys on the surface formed by blasting is placed on the current collector (18) with the blast finished surface (13) facing the uncoated portion (19) of the current collector (18) as shown in FIG. 2(a). The blast finished surface (13) of the positive electrode tab (11) is joined to the uncoated portion (19) of the current collector (18). However, only portions which are connected on electrically are joined as shown in FIG. 2(b). Further, connected surfaces of the positive electrode tab (11) and the current collector (18) are pressed vertically to the connected surfaces. The positive electrode tab (11) tries to separate from the current collector (18) by elastic reset after the pressing process is over. However, the peaks of the blast finished surface (13) of the positive electrode tab (11) push in the surface of the current collector (18). The positive electrode tab (11) is held by the current collector (18). Contact area between the positive electrode tab (11) and the current collector (18) increase with the treatment described above.

Figure 5:
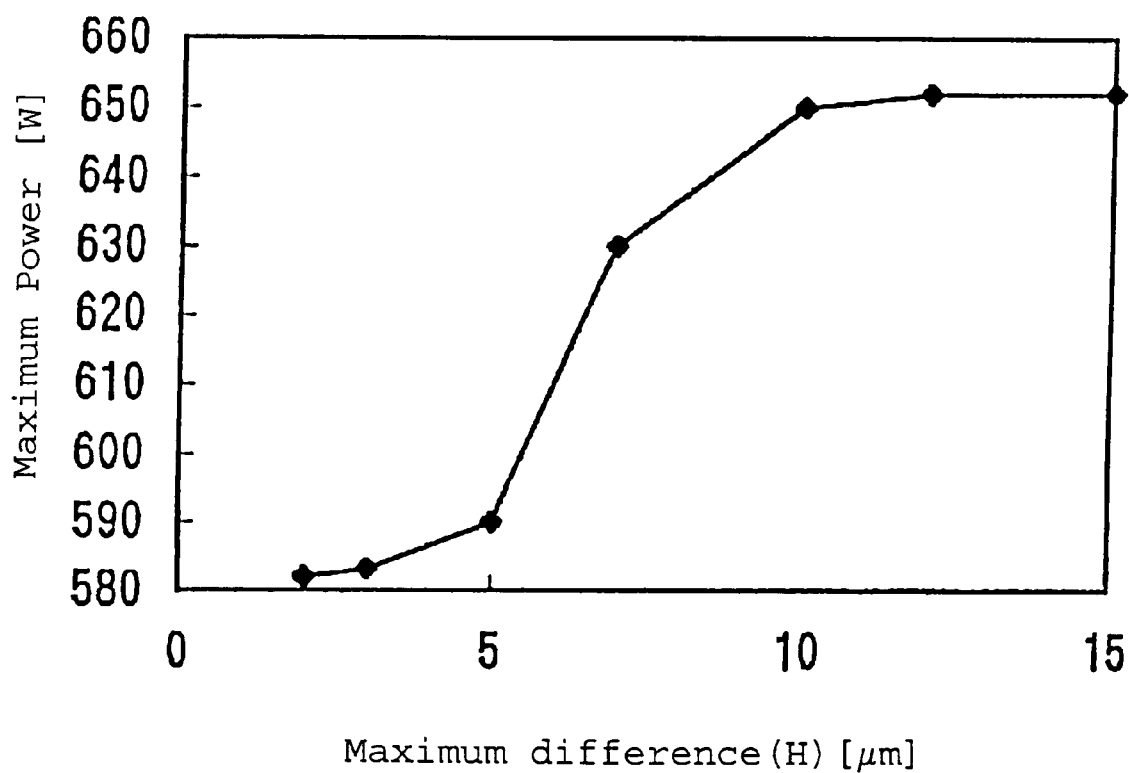
FIG. 5 is a graph showing the maximum output of a lithium secondary battery versus a maximum difference in height between peaks and valleys created on a surface of an electrode tab.
Figure 6:
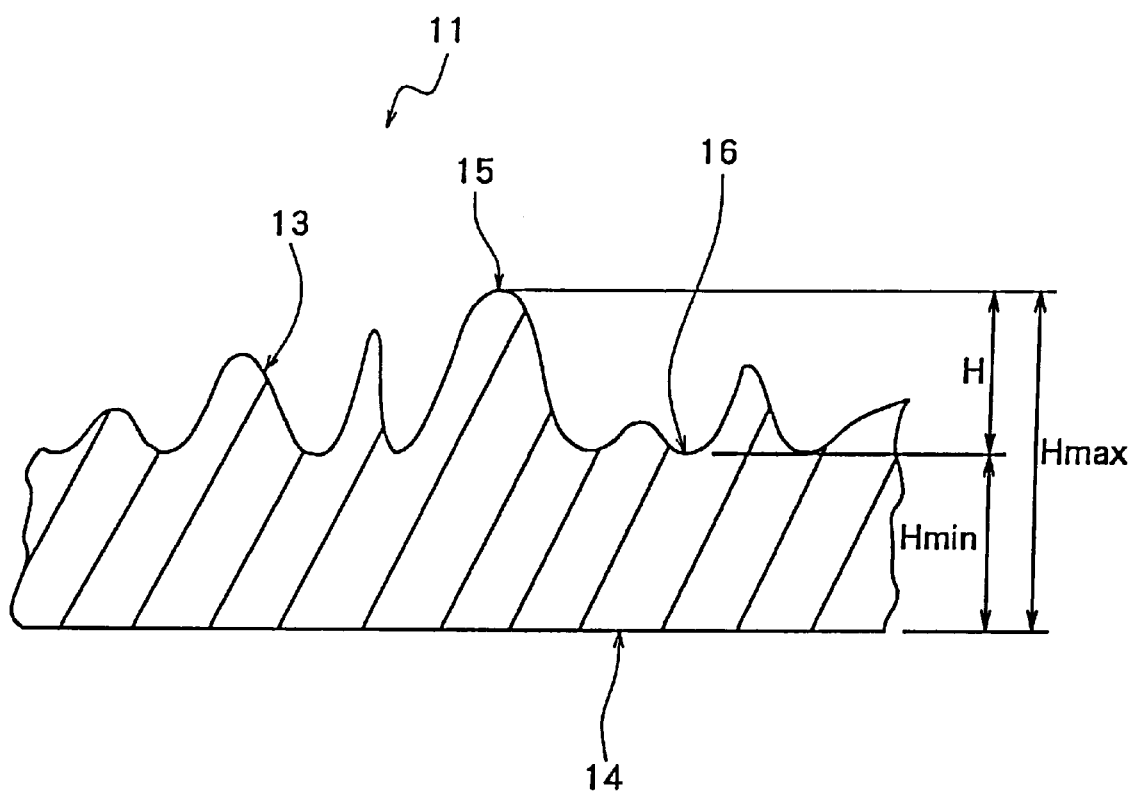
FIG. 6 illustrates a method for determining a maximum difference (H) between peaks and valleys of a roughened surface of an electrode tab according to the present invention.

FIG. 5 shows results of a test which was conducted to determine a preferable range of a maximum difference between a peak and a valley of the blast finished surface (13) of the positive electrode tab (11). Lithium batteries which have various differences of the peaks and the valleys were prepared for the test. Batteries were charged and maximum power measured when batteries were discharged at 3C.

As shown in FIG. 5, when the surface of the positive electrode tab was blasted to have a maximum difference between peaks and valleys of greater than 5 $\mu$m, maximum output increased dramatically. However, when the maximum difference was greater than 10 $\mu$m, there were not significant differences of the maximum out put. Therefore, maximum difference of a peak and a valley formed on the surface of the positive electrode tab (11) is preferably in the range of 5 to 10 $\mu$m.

EXAMPLE

Preparation of Electrode Tab

As an abrasive (75), glass beads having an average diameter of 70 $\mu$m were used. 1.5 kg of the glass beads were blasted against the positive electrode tab (11) at an ejecting pressure of 2.5 kg/cm$^2$ for 30 seconds by blast finishing equipment (7). A positive electrode tab having a maximum depth difference of the blast finished surface (13) of 10 $\mu$m was prepared.

Aluminum film having a length of 350 mm, a width of 15 mm and a thickness of 80 $\mu$m, was used for as a material of the positive electrode tab (11). Nickel film having a length of 350 mm, a width of 15 mm and a thickness of 40 $\mu$m, was used as a material of the negative electrode tab (11).

Preparation of Positive Electrode

Powder LiCoO$_2$ having an average particle diameter of 5 $\mu$m as a positive electrode active material and artificial graphite as an electric conductor were mixed in a ratio of 9:1 by weight to prepare a positive electrode mixture. Then polyfluorovinylidene as a binding agent was dissolved into N-methyl-2-pyrolidone (NMP) in amount of 5% by weight to prepare an NMP solution. The positive electrode mixture was mixed with the NMP solution in a ratio of 95:5 to prepare a slurry. The slurry was coated on both sides of an aluminum film as a positive electrode collector (18) by a doctor blade to form a positive electrode active material layer at a thickness of 50 $\mu$m, and the film was heated at 150° C. for two hours under vacuum, and then a pressing process and slitting process were conducted to prepare a positive electrode. The positive electrode had an uncoated portion, on which the active material layer was not formed on the positive electrode collector, at regular intervals.

Preparation of Negative Electrode

A dispersion of a graphite powder having d$_{002}$ of 3.35 Å, an Lc of equal to or greater than 1000 Å and an average particle diameter of particles of 20 $\mu$m in styrene-butadiene rubber (SBR) was dispersed in water. Carboxymethyl cellulose (CMC) as a thickening agent was added in a ratio of 100:5:1 by weight (graphite:SBR:CMC, when dry) to prepare a slurry. The slurry was coated on both sides of a copper film as a negative electrode collector at a thickness of 25 $\mu$m by a doctor brade to provide a weight of active material of 8 mg/cm$^2$ per one side and the film was heated at 150° C. for two hours under vacuum, and then a pressing process and slitting process were conducted to prepare a negative electrode (20). The negative electrode (20) had an uncoated portion (19) at regular intervals.

Joint of Electrode and Electrode Tab

The positive electrode tab (19) was placed on the uncoated portion (19) of the positive electrode (10) such that the blast finished surface (13) faced an uncoated portion (19). The positive electrode (11) was spot-welded at seventy spots at an output current of 20 A and a controlled frequency of 2 kHz to join the positive electrode tab (11) to the positive electrode collector (18).

The positive electrode tab (11) and the positive electrode (10) were pressed in a vertical direction to the connected surface at a pressure of 100 kgf/cm$^2$ for 5 seconds.

The negative electrode (20) and the negative electrode tab (21) were treated in the same manner as the positive electrode (10) and the positive electrode tab (11).

Preparation of Electrolyte

LiPF$_6$ was dissolved in a 2:3 by volume mixed solvent of ethylene carbonate and diethyl carbonate to a concentration of 1 M to prepare a nonaqueous electrolyte.

Preparation of Lithium Secondary Battery

The positive and negative electrode were wound as spiral coils with a separator made of polypropylene microporous membrane, and were connected to a positive electrode external terminal and a negative electrode external terminal, respectively.

The above positive electrode (10) joined with the positive electrode tab (11) were connected to the positive electrode external terminal (12), the negative electrode (20) joined with the negative electrode tab (21) was connected to the negative electrode external terminal (22), and the separator and the nonaqueous electrolyte were housed in a battery can (31) having a diameter of 65 mm and height of 300 mm, to prepare a lithium secondary battery A (1). The battery can was sealed with sealing boards (32) and insulating packings (35) consisting of a pair of insulators (33 and 34). The insulating packings were tightened with nuts (36) to seal the battery completely.

COMPARATIVE EXAMPLE

A comparative battery B was prepared in the same manner as the lithium secondary battery A(1) in above Example except that a blast finished surface was not formed on the electrode tabs. This battery has a maximum difference between a peak and a valley of 2 μm.

Discharge Capacity Test

Batteries were charged at a constant current rate 0.125 C to 4.1 V at 25° C., and then a initial discharge capacity was measured when the batteries were discharged to 2.7 V at 0.5 C or 2.0 C.

The results are shown in Table 1.

TABLE 1

|  | Discharge Capacity (Ah) | |
| --- | --- | --- |
|  | Discharge at 0.5 C | Discharge at 2.0 C |
| Lithium Secondary Battery A | 70 | 67 |
| Lithium Secondary Battery B | 70 | 60 |

There were not observed any differences between the battery of the present invention (A) and the comparative battery (B) when the batteries were discharged at 0.5 C. However, when the batteries were discharged at 2.0 C, the battery of the present invention (A) had an initial discharge capacity of 67 Ah, and the comparative battery (B) had an initial discharge capacity of 60 Ah. It was clear that a discharge capacity of the battery of the invention was increased.

Figure 7:
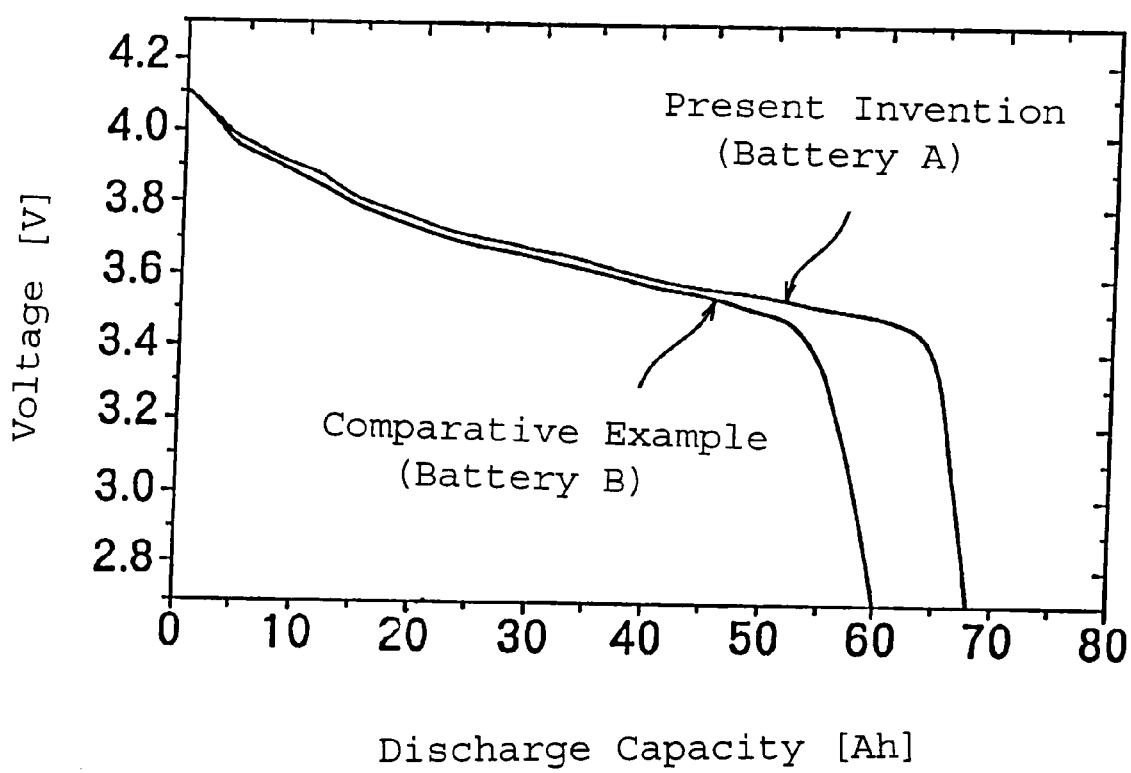
FIG. 7 is a graph showing a relationship between battery voltage and battery capacity of a battery of the present invention and that of a comparative battery.
Figure 8:
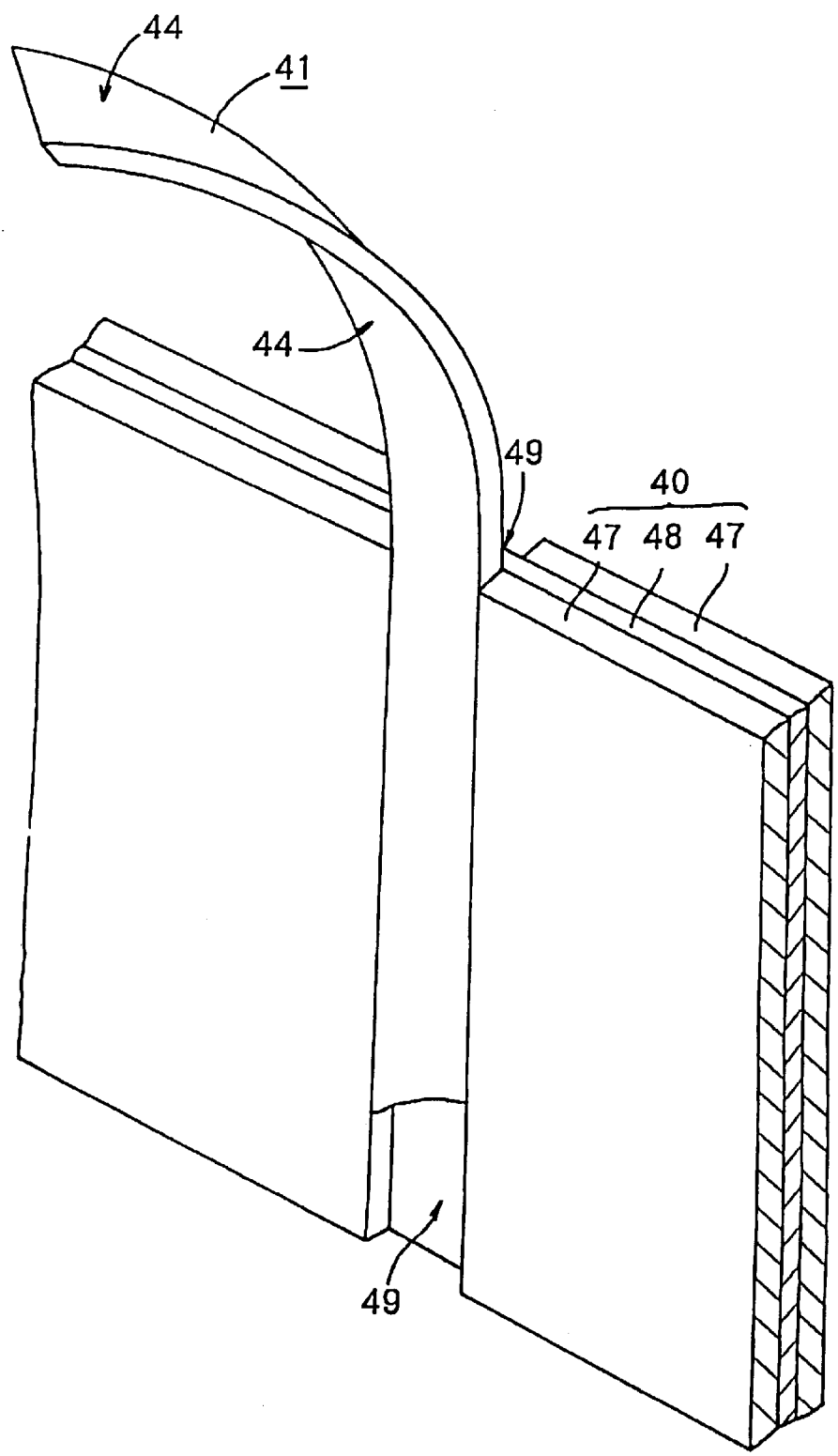
FIG. 8 is a partial view illustrating a structure of an electrode tab and an electrode of a conventional lithium secondary battery.
Figure 9A:
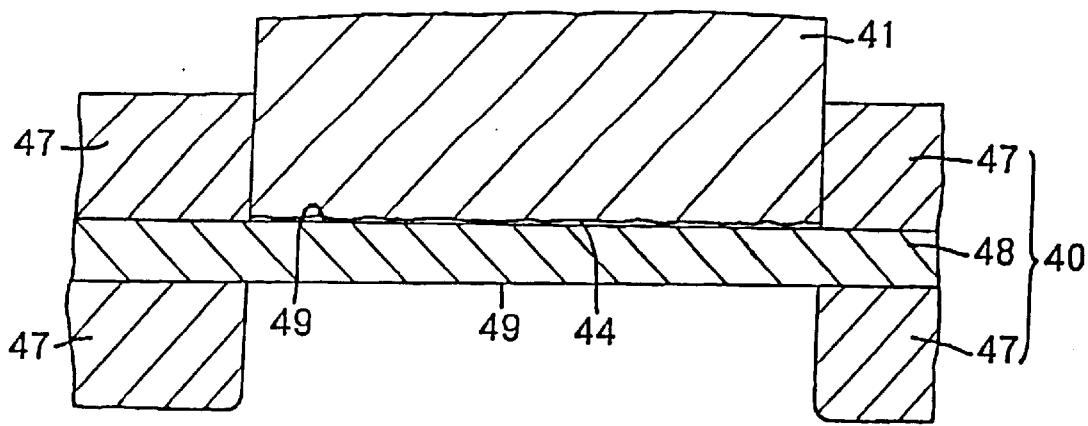
FIG. 9 illustrates steps of joining an electrode tab to an electrode in a conventional lithium secondary battery.
Figure 9B:
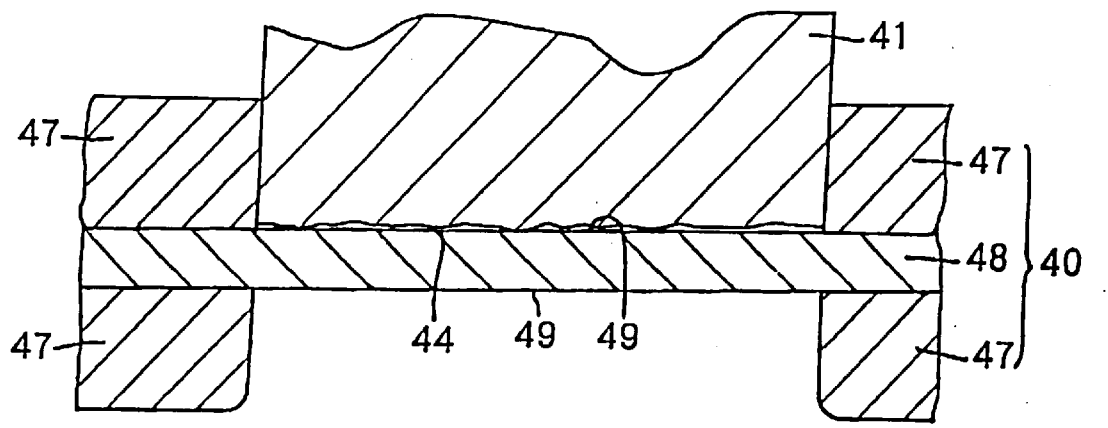
Figure 9C:
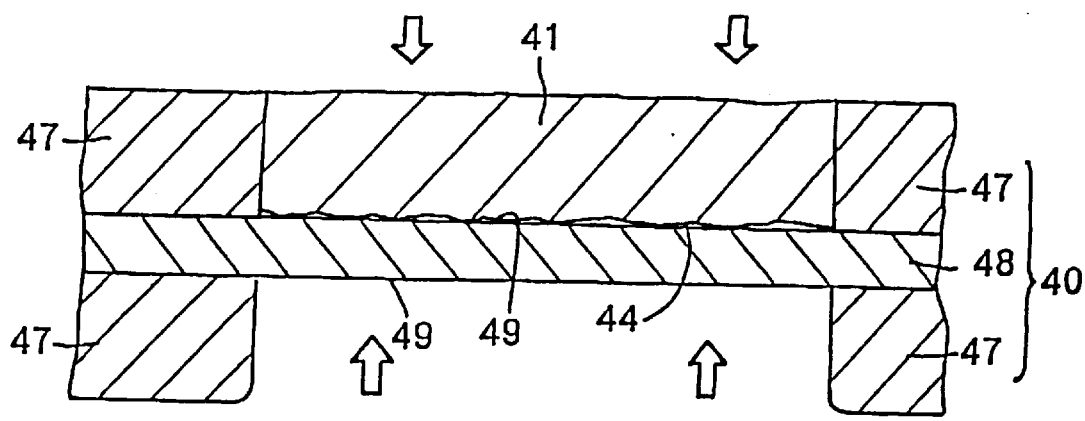
Figure 10:
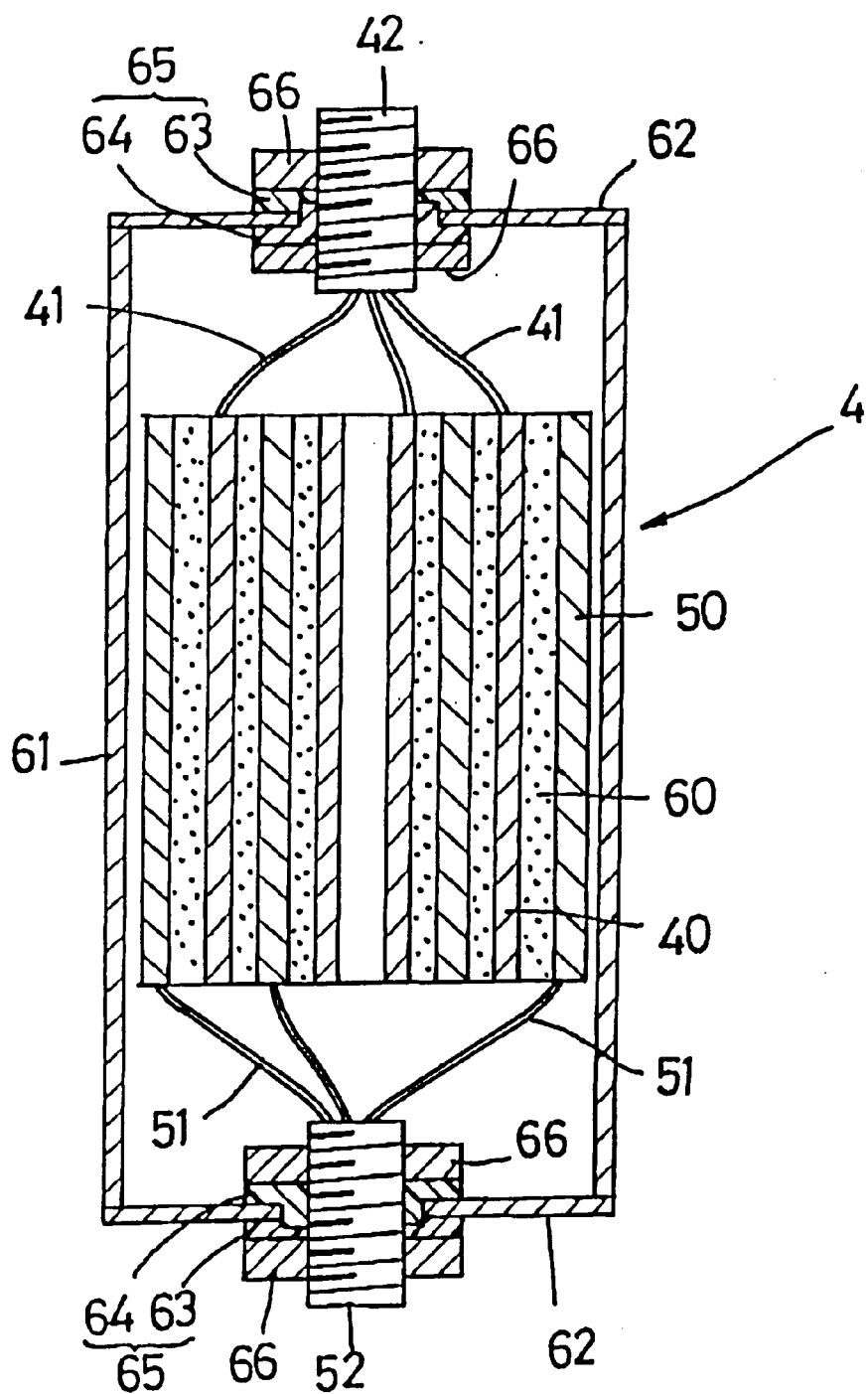
FIG. 10 is a cross section of a conventional lithium secondary battery.

FIG. 7 is a graph of charge-discharge curves of each of the batteries (A and B) when the batteries were discharged at 2.0 C. The comparative battery reduced an operating voltage earlier than the battery of the present invention.

Measurement of Power

A peak power was calculated from a current-electrical voltage curve which was prepared when the batteries were charged at a constant current rate 0.125 C to 4.1 V at 25° C., and then were discharged for 10 seconds at 0~3 C. Both batteries, i.e., the battery of the present invention and the comparative battery had a peak power at 3 C. The results are shown in the table 2.

TABLE 2

|  | Maximum Output (W) |
| --- | --- |
| Lithium Secondary Battery A | 650 |
| Lithium Secondary Battery B | 580 |

The battery of the present invention had a maximum output of 650 W. It was significantly increased compared to that of the comparative battery, i.e., 580 W. These results support a conclusion that an internal resistance was reduced for the battery of the present invention.

It is believed that the reasons why the present invention does not show improvement during low electric current discharge is that the reduction in internal resistance in the present invention, so called loss by IR resistance (IR drop), is small during low rate discharge. Therefore, there are not differences of discharge capacity between the battery of the present invention (A) and the comparative battery (B) during low rate discharge. However, the comparative battery has a larger IR drop during high electric current discharge, and the discharge capacity becomes smaller than that of the battery of the present invention.

It is of course possible to modify each of the elements within the scope of the present invention. A battery of the present invention is not limited to only a secondary battery but also includes a primary battery.

What is claimed is:

1. A lithium battery comprising positive and negative electrodes, at least one of said electrodes comprising a current collector and a layer of an active material capable of occluding and discharging lithium electrochemically provided on a surface of the current collector; an electrode external terminal connected to the electrode for providing electricity to the outside of the battery; and an electrode tab provided between the electrode and the electrode external terminal and joined at an end thereof to a surface of the current collector of the electrode and being connected at another end thereof to said electrode external terminal, wherein said electrode tab has a roughened surface and an untreated surface at the end joined to the current collector, said roughened surface having peaks and valleys wherein the difference (H) between a length (Hmax) of the highest peak from the untreated surface and a length (Hmin) of the deepest valley from the untreated surface is from 5 to 10 μm, and said roughened surface is welded to the surface of said current collector.

2. A lithium battery according to claim 1, wherein said roughened surface is formed by chemical etching, abrasion by an abrasive, abrasion by ultrasonic wave or abrasion by blasting.

* * * * *